United States Patent
Takagi et al.

(10) Patent No.: US 10,228,567 B2
(45) Date of Patent: Mar. 12, 2019

(54) VIRTUAL IMAGE DISPLAY APPARATUS

(71) Applicant: SEIKO EPSON CORPORATION, Tokyo (JP)

(72) Inventors: Masayuki Takagi, Matsumoto (JP); Takahiro Totani, Suwa (JP); Takashi Takeda, Suwa (JP); Akira Komatsu, Tatsuno-Machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 171 days.

(21) Appl. No.: 15/079,573

(22) Filed: Mar. 24, 2016

(65) Prior Publication Data

US 2016/0282629 A1 Sep. 29, 2016

(30) Foreign Application Priority Data

Mar. 25, 2015 (JP) .................. 2015-062187

(51) Int. Cl.
*G02B 27/01* (2006.01)
*G02B 3/00* (2006.01)

(52) U.S. Cl.
CPC ..... *G02B 27/0179* (2013.01); *G02B 27/0172* (2013.01); *G02B 3/0006* (2013.01); *G02B 2027/0118* (2013.01)

(58) Field of Classification Search
None
See application file for complete search history.

(56) References Cited

U.S. PATENT DOCUMENTS

| | | | | |
|---|---|---|---|---|
| 5,459,592 A | * | 10/1995 | Shibatani | G02B 3/0056 349/5 |
| 6,288,842 B1 | * | 9/2001 | Florczak | G02B 5/128 359/619 |
| 6,518,640 B2 | * | 2/2003 | Suzuki | H01L 27/14601 257/432 |
| 2007/0058258 A1 | * | 3/2007 | Mather | G02B 27/2214 359/619 |
| 2011/0170184 A1 | * | 7/2011 | Wolk | G02B 27/2214 359/463 |

(Continued)

FOREIGN PATENT DOCUMENTS

| | | |
|---|---|---|
| JP | H06-313860 A | 11/1994 |
| JP | 2013-037260 A | 2/2013 |
| JP | 2014-130218 A | 7/2014 |

*Primary Examiner* — Dorothy Harris
(74) *Attorney, Agent, or Firm* — Oliff PLC

(57) ABSTRACT

Principal rays of component lights output from a periphery side of respective positions of an image surface generated in an image generation unit forming an image display device are controlled in an intensity distribution control unit so that the principal rays may be inclined more largely toward a center optical axis side than principal rays of component lights output from a center side and output, control is performed so that lights are output in the strongest intensity distributions with respect to axial directions of the principal rays of the respective component lights of image lights output in the respective positions by the intensity distribution control unit, and further, the positions can be adjusted by adjustment of output angles of the respective component lights in response to an aspect ratio of the image surface.

13 Claims, 10 Drawing Sheets

(56) References Cited

U.S. PATENT DOCUMENTS

| | | | | |
|---|---|---|---|---|
| 2012/0086623 A1* | 4/2012 | Takagi | ................ | G02B 6/0053 |
| | | | | 345/7 |
| 2012/0320347 A1* | 12/2012 | Morikuni | ............... | G02B 13/12 |
| | | | | 353/101 |
| 2013/0016278 A1* | 1/2013 | Matsusaka | ......... | G02B 13/0045 |
| | | | | 348/360 |
| 2014/0092498 A1* | 4/2014 | Ono | ....................... | G02B 5/201 |
| | | | | 359/891 |
| 2014/0300709 A1* | 10/2014 | Futterer | .............. | G03H 1/2286 |
| | | | | 348/51 |
| 2017/0171533 A1* | 6/2017 | Benitez | ............... | H04N 13/044 |

* cited by examiner

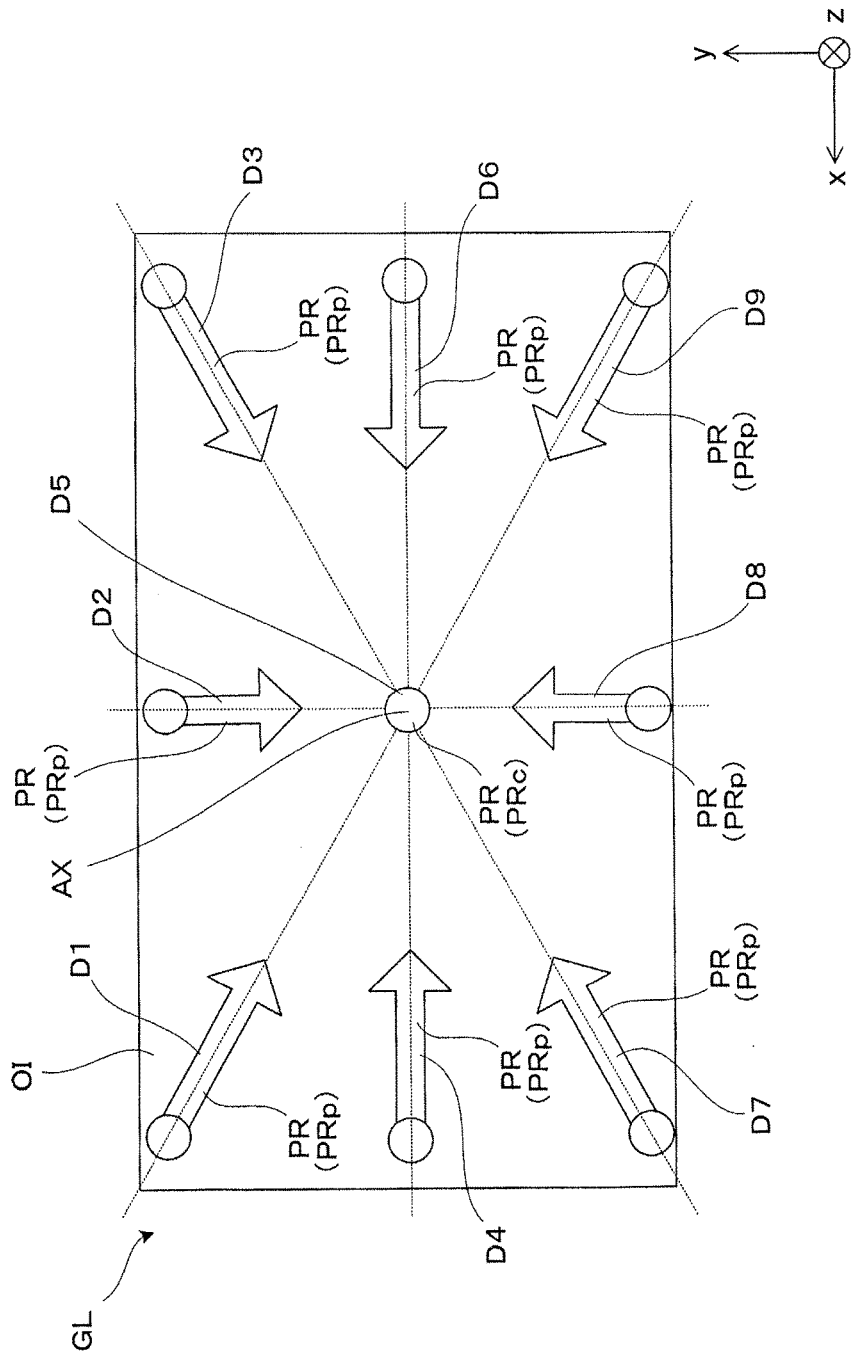

VIRTUAL IMAGE DISPLAY APPARATUS

BACKGROUND

1. Technical Field

The present invention relates to a virtual image display apparatus that presents images formed by an image display device to an observer.

2. Related Art

Various systems have been proposed as optical systems incorporated in virtual image display apparatuses including head mounted displays (hereinafter, referred to as HMDs) attached to heads of observers (for example, see Patent Document 1 (JP-A-2013-37260)).

As the virtual image display apparatus, for example, a technology of reducing luminance spots by forming respective output lights output from a panel forming image lights with principal rays at partially different output angles not in parallel to the optical axis (that is, forming non-uniform distributions by varying directionality) is known (see Patent Document 1).

As a configuration shown in Patent Document 1 or the like, for example, in the case where the directionality is varied and the principal rays of lights output from the peripheral part of the panel are directed outward from the panel, it may be necessary to increase the sizes of the respective optical systems including a light guide device and an eyepiece optical system provided at the downstream of the optical path of the panel.

Further, in the above described non-telecentric optical system in which the output angles of principal rays are partially different, it is highly likely that, when the position of the panel is moved along the optical axis direction, the aspect ratio of the virtual image finally visually recognized is changed to be different from the aspect ratio of the surface of image lights (hereinafter, also referred to as image surface) formed in the original position of the panel. Accordingly, for example, it may be difficult to adjust the imaging position within a desired range by moving the panel along the optical axis direction in response to correction of the manufacturing error, setting of the anticipated position of the virtual image, or the like.

SUMMARY

An advantage of some aspects of the invention is to provide a virtual image display apparatus in which optical systems may be downsized, thereby, the whole apparatus may be downsized, generation of brightness irregularities and color irregularities may be suppressed, and further, positions of component members can be adjusted.

A virtual image display apparatus according to an aspect of the invention includes an image display device having an image generation unit that generates an image surface corresponding to a virtual image to be visually recognized with reference to a center optical axis of an entire optical system using lights from a light source, and an intensity distribution control unit that controls intensity distributions of output lights output from respective positions on the image surface to output principal rays of component lights output from a periphery side of the image surface with larger inclinations toward the center optical axis side than those of principal rays of component lights output from a center side of the image surface, and a virtual image optical system that allows visual recognition of the lights output from the image display device.

In the virtual image display apparatus, the principal rays of the component lights output from the periphery side of the respective positions on the image surface generated in the image generation unit forming the image display device are controlled in the intensity distribution control unit so that the principal rays may be inclined more largely toward the center optical axis side than the principal rays of the component lights output from the center side and output. Thereby, the virtual image optical system provided at the downstream of the optical path of the image display device may be downsized, and further, the whole apparatus may be downsized. Furthermore, in the image display device, for example, the output states of the output lights are controlled by the intensity distribution control unit, and thereby, generation of brightness irregularities and color irregularities may be suppressed and the relative position between the image display device and the virtual image optical system can be adjusted.

In a specific aspect of the invention, the intensity distribution control unit outputs the principal rays toward the virtual image optical system with inclinations of output angles of the principal rays of output lights at the periphery side in at least one direction of a horizontal direction and a vertical direction with respect to in-plane directions in parallel to the image surface. In this case, the output angles of the principal rays are adjusted with respect to at least one of the horizontal direction and the vertical direction, and thereby, the whole apparatus may be downsized.

In a specific aspect of the invention, the intensity distribution control unit outputs the principal rays toward the virtual image optical system with inclinations of the output angles of the principal rays in the horizontal direction at different angles from the output angles of the principal rays in the vertical direction. In this case, sufficient adjustment in the horizontal direction and the vertical direction may be performed, respectively.

In another aspect of the invention, the intensity distribution control unit adjusts the output angles of the principal rays in the vertical direction relative to the output angles of the principal rays in the horizontal direction in response to a shape of the image surface. In this case, for example, the output angles of the principal rays in the horizontal direction and the output angles of the principal rays in the vertical direction are adjusted in response to the aspect ratio of the image surface, and thereby, even when the image display device is moved along the center optical axis, the aspect ratio of the visually recognized virtual image may be kept without change.

In still another aspect of the invention, when the image display device is moved along the center optical axis, the intensity distribution control unit adjusts the output angles in response to a relationship between an aspect ratio of the virtual image to be visually recognized and an aspect ratio of the image surface.

In yet another aspect of the invention, in the image display device, the image generation unit outputs lights in the strongest intensity distributions with respect to axial directions of the principal rays of components output from the respective positions on the image surface. In this case, the use efficiency of lights is improved and variations in the maximum intensity of light with respect to each position on the image surface are avoided, and thereby, brightness irregularities and color irregularities may be suppressed.

In still yet another aspect of the invention, in the image display device, the output angles of the output lights output from the respective positions on the image surface are set symmetrically with reference to the center optical axis, and the principal rays of the output lights output from the respective positions on the image surface intersect on the center optical axis. In this case, the optical systems may be downsized while generation of distortion of images or the like is avoided. Further, brightness irregularities and color irregularities of the entire picture lights output from the image surface may be suppressed.

In further another aspect of the invention, the intensity distribution control unit outputs the principal rays of the component output from a position of an intersection point with the center optical axis in the image surface perpendicularly to the image surface, and gradually increases the output angles of the principal rays with respect to the center optical axis in response to distances from the center optical axis. In this case, intensity distribution control may be performed at the balanced degree of inclinations.

In still further another aspect of the invention, in the image display device, tangents of the output angles of the principal rays output from the respective positions on the image surface with respect to the center optical axis are proportional to distances from a center of the image surface to the output positions of the respective principal rays. In this case, when the output angles are provided so that the lights output from the position farther from the center of the image surface may be directed closer to the center side, appropriate inclinations may be provided and pencils of rays at the balanced degree of focus may be formed.

In yet further another aspect of the invention, the image display device contains an organic EL that emits lights with respect to each pixel forming the image surface as the light source. In this case, the organic EL as a self-emitting device is used, and thereby, high-efficient and high-definition image formation may be performed while the size and the weight of the apparatus are reduced.

In still yet further another aspect of the invention, the image generation unit is a pixel matrix forming the image surface by arrangement of pixels in a matrix form, and the intensity distribution control unit has different shapes with respect to each position on the image surface with respect to a pitch of the pixels in the matrix form forming the image surface. In this case, the intensity distribution control unit has the different shapes with respect to each position on the image surface, and thereby, light control suitable for each position on the image surface may be performed.

In a further another aspect of the invention, the intensity distribution control unit is color filter layers arranged with a smaller pitch than the pitch of the pixels in the matrix form forming the image surface. In this case, the lights are controlled with respect to each pixel by the arrangement of the color filter layers, and high-quality images may be formed while the ranges and the angles of the lights passed through are adjusted and brightness irregularities and color irregularities are suppressed in each pixel.

In a still further another aspect of the invention, the intensity distribution control unit is microlens arrays non-uniformly arranged with respect to the arrangement of pixels in response to positions of the pixels in the matrix form forming the image surface. In this case, for example, the shapes of the microlens arrays are adjusted into non-uniform arrangement with respect to the arrangement of pixels, and thereby, high-quality images may be formed while the ranges and the angles of the lights passed through are adjusted in response to the positions of pixels, e.g., by the control of lights with respect to each pixel, and brightness irregularities and color irregularities are suppressed in each pixel.

In a yet further another aspect of the invention, the intensity distribution control unit is black matrices having different shapes in response to positions of the pixels in the matrix form forming the image surface. In this case, high-quality images may be formed while the ranges and the angles of the lights passed through are adjusted according to the sizes and shapes of the black matrices and brightness irregularities and color irregularities are suppressed in each pixel.

In a still yet further another aspect of the invention, a virtual image display position adjustment part that adjusts a display position of the virtual image by moving the image display device is further provided. In this case, the view of the virtual image may be changed by the virtual image display position adjustment part.

BRIEF DESCRIPTION OF THE DRAWINGS

The invention will be described with reference to the accompanying drawings, wherein like numbers reference like elements.

FIG. 5 is a conceptual diagram for explanation of output angles of principal rays.

DESCRIPTION OF EXEMPLARY EMBODIMENTS

As below, a virtual image display apparatus according to one embodiment of the invention will be explained in detail with reference to FIG. 1 etc.

Figure 1:
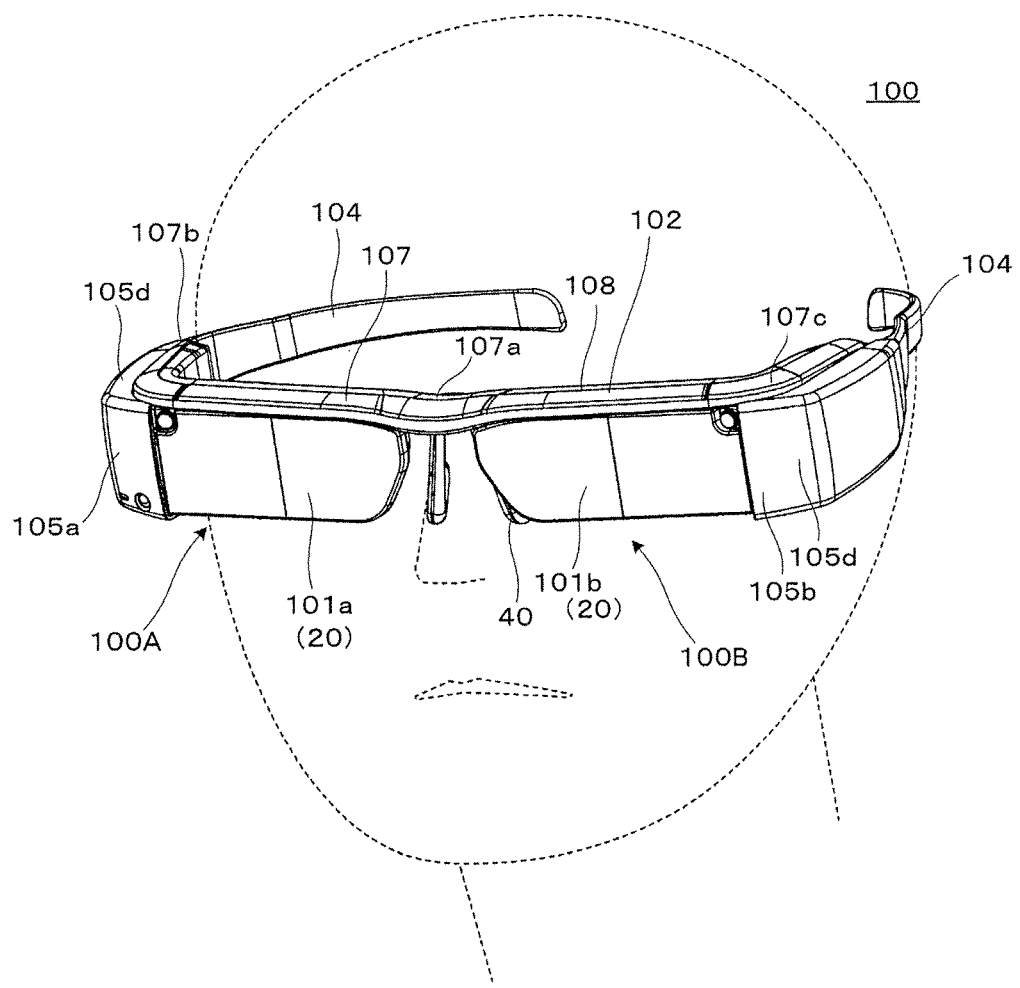
FIG. 1 is a perspective view for brief explanation of an appearance of an example of a virtual image display apparatus according to an embodiment.
Figure 2:
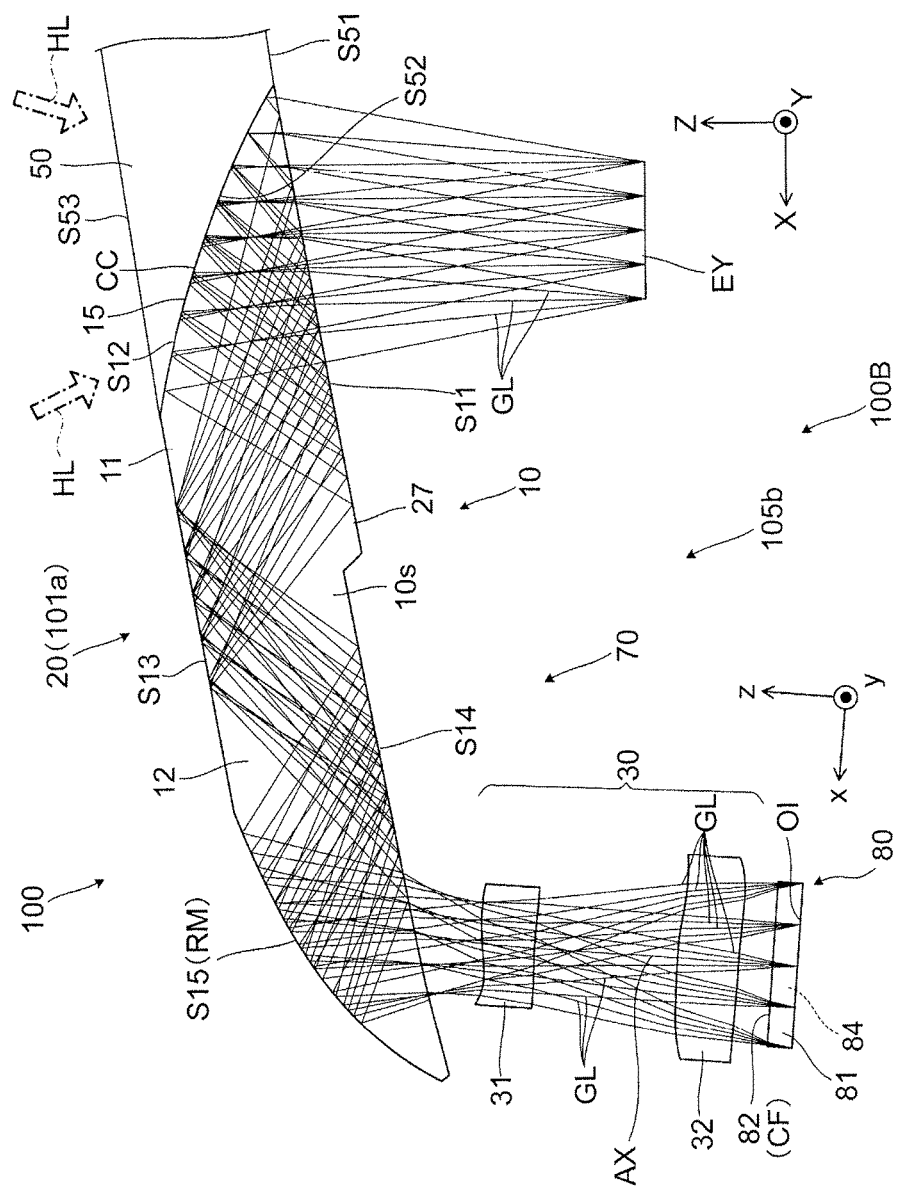
FIG. 2 shows optical paths of a main body part forming the virtual image display apparatus.

As shown in FIG. 1, a virtual image display apparatus 100 of the embodiment is a head mounted display having an appearance like spectacles, and a virtual image display apparatus that enables an observer or a user wearing the virtual image display apparatus 100 to visually recognize image lights (picture lights) by virtual images and visually recognize or observe an outside world image in see-through vision. The virtual image display apparatus 100 includes first and second optical members 101a, 101b for see-through covering in front of eyes of the observer, a frame part 102 that supports both of the optical members 101a, 101b, and first and second image formation main body parts 105a, 105b added to parts from both of the left and right ends of the frame part 102 to posterior temple parts (temples) 104. Here, a first display apparatus 100A as a combination of the first optical member 101a and the first image formation main body part 105a on the left in the drawing is a unit forming virtual images for right eye and functions as a virtual image display apparatus even by itself. Further, a second display apparatus 100B as a combination of the second optical member 101b and the second image formation main body part 105b on the right in the drawing is a unit forming virtual images for left eye and functions as a virtual image display apparatus even by itself. Note that, from comparison of FIG. 2 with FIG. 1, it is known that, for example, each of the first and second image formation main body parts 105a, 105b includes a projection lens 30 and an image display device 80 containing an image generation unit (picture device) 81. FIG. 2 shows the display apparatus for left eye and the display apparatus for right eye is omitted, and the display apparatus for right eye has the same structure.

Further, as shown in FIG. 1, the frame part 102 provided in the virtual image display apparatus 100 includes a frame 107 provided on the upper end side and a resin part 108 provided on the rear side along the frame 107. Note that the virtual image display apparatus 100 has a configuration without a frame-like part on the downside. The frame 107 forming the frame part 102 is a member in an elongated plate shape bent in a U-shape, and includes a front part 107a extending in the lateral direction (here, also referred to as the horizontal direction) as a direction corresponding to the row of the eyes for the observer and a pair of side parts 107b, 107c extending in the depth direction corresponding to the anteroposterior direction for the observer. The frame 107, i.e., the front part 107a and the side parts 107b, 107c is a metal integrated component formed using various metal materials including aluminum die cast. The resin part 108 is provided along the frame 107 and fitted in the frame 107, and thereby, can house e.g. various cables etc. for image formation in cooperation with the frame. Note that a nose receiving part 40 is additionally provided to the frame 102.

As shown in FIG. 2, the second display apparatus 100B may be regarded as an apparatus including a projection see-through device 70 as an optical system for projection and the image display device 80 that forms picture lights. The projection see-through device 70 includes the second optical member 101b or a light guide device 20 and the projection lens 30 for imaging, and has a role of projecting an image formed by the image display device 80 as a virtual image on the eye of the observer. In other words, the projection see-through device 70 is a virtual image optical system that guides lights from an image surface OI as the surface of the image lights (picture lights) formed in the image display device 80 (also the panel surface indicating the panel position of the panel forming the image display device 80) and allows the observer to visually recognize a virtual image, and also an imaging system that reimages on the retina of the observer. The second optical member 101b or the light guide device 20 includes a light guide member 10 for light guiding and see-through vision and a light transmissive member 50 for see-through vision. Note that the second image formation main body part 105b includes the image display device 80 and the projection lens 30. Further, with respect to a center optical axis AX as an optical axis reference of the above described optical systems, the image surface OI is formed to be a surface perpendicular to the center optical axis AX at the center of the image in which the position passing through the center optical axis AX is formed. That is, the image surface OI is generated with reference to the center optical axis AX as the reference axis of the entire optical system.

The image display device 80 includes the image generation unit (picture device) 81 that forms the image surface OI including pixels in a matrix form by a self-emitting illumination containing an organic EL as a light source, an intensity distribution control unit 82 that is provided at the immediate downstream of the image generation unit 81 and controls intensity distributions of the respective components of the picture lights GL output from the image surface OI of the image generation unit 81, and additionally has a drive control unit 84 that controls operations of the image generation unit 81 etc. Note that, though the details will be described later with reference to FIGS. 4A and 4B, here, a color filter layer CF provided at the immediate downstream of the image generation unit 81 functions as the intensity distribution control unit 82, and thereby, regarding the picture lights GL, the component lights output from the parts closer to the periphery side of the image surface OI are output at angles inclined toward the inner side. Note that, in the case of the self-emitting illumination, the image surface OI is also a light emitting surface.

The projection lens 30 is a projection system that projects the picture lights GL output from the image display device 80 toward the light guide device 20. In the embodiment, the intensity distributions and the output angles of the respective components of the picture lights GL as output lights are controlled in the image display device 80, and thereby, the projection lens 30 is downsized.

As described above, the light guide device 20 includes the light guide member 10 for light guiding and see-through vision and the light transmissive member 50 for see-through vision. The light guide member 10 is a part of the prism-shaped light guide device 20 and an integrated member, however, may be considered as a division into a first light guide part 11 at the light-exiting side and a second light guide part 12 at the light-incident side. The light transmissive member 50 is a member that assists the see-through function of the light guide member 10 (auxiliary optical block) and integrally fixed to the light guide member 10 into one light guide device 20. Note that, of the light guide device 20 having the above described configuration, the end portion located at the light source side (base side) is fitted in the end portion of the lens tube part, and thereby, the light guide device is accurately positioned and fixed to the projection lens 30.

Here, in the virtual image display apparatus 100 having the above described configuration, for further downsizing, the component lights of the picture lights GL output from the parts closer to the periphery side of the image surface OI of the image display device 80 are inclined toward the inner side, i.e., the center optical axis AX side. More specifically, as shown in the partially enlarged view of FIG. 3, regarding the component lights (partial pencil of rays) forming the picture lights GL as output lights output from the respective positions on the image surface OI of the image display device 80, intensity distributions of the respective components are controlled before output. Regarding the intensity distributions, attention is focused on the principal rays PR of the respective component lights (partial pencil of rays). First, the principal ray PRc of the component light (partial luminous flux) output from the center of the image surface OI is perpendicular to the image surface OI (i.e., in parallel to the center optical axis AX). On the other hand, the principal rays PRp of the component lights (partial pencil of rays) closer to the periphery side separate from the center of the image surface OI are gradually inclined toward the inner side with respect to the center optical axis AX side. That is, the image display device 80 outputs the principal rays PRp of the component lights output from the parts closer to the periphery side of the image surface OI are more largely inclined and output toward the center optical axis AX side than the principal ray PRc of the component light output from the center side of the image surface OI. Thereby, in the virtual image display apparatus 100 of the embodiment, the picture lights GL as a whole are output so that the spread of the pencils of rays may be suppressed as shown by arrows A1, A2, and therefore, the projection lens 30 as the optical device provided at the downstream of the optical path of the image display device 80 and forming the virtual image optical system is downsized.

As below, referring to FIGS. 4A and 4B, of the virtual image display apparatus 100, regarding the image display device 80, a more specific example of the optical configuration will be explained in detail.

First, as described above, the image display device 80 is the self-emitting image display device having the image generation unit 81 and the color filter layer CF provided at the immediate downstream of the image generation unit 81 as the intensity distribution control unit 82, and additionally has the drive control unit 84 that controls the operation of the image generation unit 81. One configuration example of the image display device 80 is specifically explained with reference to FIGS. 4A and 4B. The image generation unit 81 of the image display device 80 includes a plurality of transparent electrodes (anodes) 71a as pixel electrodes, a counter electrode (cathode) 72a, an organic EL layer 73a as a light emitting function layer provided between the transparent electrodes 71a and the counter electrode 72a, and a protective layer 74a. The color filter layer CF as the intensity distribution control unit 82 is formed on the protective layer 74a. The color filter layer CF includes red, green and blue color filter parts CFr, CFg, CFb, and the color filter parts CFr, CFg, CFb for the respective colors are arranged in a matrix form respectively corresponding to the plurality of transparent electrodes (anodes) 71a as pixel electrodes. According to the configuration, the image display device 80 allows the organic EL layer 73a to emit light by appropriately operating the electrodes 71a, 72a, and thereby, the image generation unit 81 outputs picture lights GL from the image surface OI. That is, the image display device 80 includes the organic EL as a light source and emits the picture lights GL with respect to each pixel forming the image surface OI. Further, the lights emitted by the image generation unit 81 as the picture lights GL pass through the color filter layer CF, and thereby, colored picture lights (image lights) GL are output from the image display device 80. Here, in the embodiment, in the color filter layer CF as the intensity distribution control unit 82, the color filter parts CFr, CFg, CFb for the respective colors are arranged with a pitch smaller than the pitch of the pixels in the matrix form forming the image surface OI, i.e., the pitch of the plurality of transparent electrodes 71a, 71a, 71a provided in the matrix form. Thereby, as shown in FIG. 4A, at the periphery side apart from the center optical axis AX of the image display device 80, the positions of the color filter parts CFr, CFg, CFb for the respective colors are shifted with respect to the respective electrodes 71a, 71a, 71a (in the case of the drawing, the positions of the color filter parts CFr, CFg, CFb for the respective colors are shifted toward the right side or the positions of the outer edges are shifted), and thereby, the intensity distribution states of the component lights output through the color filter layer CF are diagonally inclined (in the case of the drawing, diagonally to the right), and the component lights are output to be closer to the center optical axis AX side. On the other hand, as shown in FIG. 4B, around the center optical axis AX, i.e., at the center side of the image display device 80, the above described shift is not produced or slight if produced, and thereby, the intensity distribution states of the component lights are not inclined, but the component lights are output perpendicularly or nearly perpendicularly.

In summary, in the image display device 80, the image generation unit 81 is a pixel matrix for formation of the image surface OI by arrangement of the pixels in the matrix form using the plurality of transparent electrodes 71a as the pixel electrodes, and the color filter layer CF as the intensity distribution control unit 82 has shapes different with respect to each position on the image surface OI so that shifts with respect to the pitch of the pixels in the matrix form (the pitch of the transparent electrodes 71a) forming the image surface OI may be larger from the center side to the periphery side. Thereby, the control is performed so that the intensity distribution states of the lights may be suitable with respect to each position on the image surface OI. That is, the lights at the angles to be principal rays of the lights output in the respective positions are made strongest, and, as a result, the color filter layer CF as the intensity distribution control unit 82 controls to output lights in the strongest intensity distributions with respect to the axial directions of the principal rays of the components output from the respective positions on the image surface OI. As described above, in the embodiment, the color filter layer CF functions as the intensity distribution control unit 82 that controls the intensity distributions of the picture lights GL as output lights.

As below, returning to FIG. 2, the role of the projection see-through device 70 as the virtual image optical system, i.e., the light guide device 20 and the projection lens 30 will be explained in detail.

The projection lens 30 is an optical system that allows incidence of the picture lights GL from the image display device 80 and projects the lights, and a projection system including two optical elements (lenses) 31, 32 along the center optical axis AX. The optical elements 31, 32 each includes an aspheric lens containing both a non-axisymmetric aspheric surface and an axisymmetric aspheric surface, and forms an intermediate image corresponding to a display image of the image generation unit 81 inside of the light guide member 10 in cooperation with a part of the light guide member 10. Note that the optical elements 31, 32 forming the projection lens 30 are housed and supported within the second image formation main body part 105b by e.g. a lens tube part (not shown).

As described above, the light guide device 20 includes the light guide member 10 and the light transmissive member 50. Of them, the light guide member 10 linearly extends in a part at the center side near the nose (in front of the eye) in the plan view. Of the light guide member 10, the first light guide part 11 provided at the center side near the nose, i.e., the light-exiting side has a first surface S11, a second surface S12, and a third surface S13 as side surfaces having optical functions and the second light guide part 12 provided at the periphery side apart from the nose, i.e., the light-incident side has a fourth surface S14 and a fifth surface S15 as side surfaces having optical functions. Of them, the first surface S11 and the fourth surface S14 are continuously adjacent and the third surface S13 and the fifth surface S15 are continuously adjacent. Further, the second surface S12 is provided between the first surface S11 and the third surface S13, and the fourth surface S14 and the fifth surface S15 are adjacent at a large angle. Furthermore, here, the first surface S11 and the third surface S13 in the opposed arrangement have planar shapes nearly in parallel to each other. On the other hand, the other surfaces having the optical functions, i.e., the second surface S12, the fourth surface S14, and the fifth surface S15 are non-axisymmetric curved surfaces (free-form surfaces).

As described above, the light transmissive member 50 is integrally fixed to the light guide member 10 to form one light guide device 20 and assists the see-through function of the light guide member 10 (auxiliary optical block). The light transmissive member 50 has a first transmissive surface S51, a second transmissive surface S52, and a third transmissive surface S53 as side surfaces having optical functions. Here, the second transmissive surface S52 is provided between the first transmissive surface S51 and the third transmissive surface S53. The first transmissive surface S51 is on a surface as an extension of the first surface S11 of the light guide member 10, and the second transmissive surface S52 is a curved surface joined to and integrated with the second surface S12 by a bonding layer CC, and the third transmissive surface S53 is on a surface as an extension of the third surface S13 of the light guide member 10. Of them, the second transmissive surface S52 and the second surface S12 of the light guide member 10 are integrated by joining via the thin bonding layer CC and have shapes with nearly the same curvatures.

Note that, of the plurality of surfaces forming the light guide member 10, the other surfaces S14, S15 than the surfaces from the first surface S11 to the third surface S13 each includes at least one point with a different sign of curvature depending on the direction with respect to at least one free-form surface. Thereby, the light guide member 10 can be downsized while light guiding of the picture lights GL is accurately controlled.

A main body 10s of the light guide member 10 is formed using a resin material that exhibits higher light transmissivity in a visible range, and molded by e.g. injection and solidification of a thermoplastic resin in a die. Note that, as a material for the main body 10s, e.g. cycloolefin polymer or the like may be used. The main body 10s is integrally molded, however, the light guide member 10 may be considered in the functional division into the first light guide part 11 and the second light guide part 12 as described above. The first light guide part 11 enables waveguide and output of the picture lights GL and enables see-through vision of the outside world light HL. The second light guide part 12 enables incidence and waveguide of the picture lights GL.

In the first light guide part 11, the first surface S11 functions as a refracting surface that outputs the picture lights GL to the outside of the first light guide part 11, and functions as a total reflection surface that totally reflects the picture lights GL on the inner surface side. The first surface S11 is placed in front of an eye anticipated position EY anticipated as the position of the eye (hereinafter, also simply referred to as "eye EY" including the case where the eye is actually placed in the eye anticipated position EY), and forms the planar shape as described above. Note that the first surface S11 is a surface formed by a hard coat layer 27 provided on the surface of the main body 10s.

On the second surface S12, a half-mirror layer 15 is attached to the surface of the main body 10s. The half-mirror layer 15 is formed not only on the whole second surface S12, but on a partial area (not shown) of the second surface S12 reduced with respect to the vertical direction mainly along the Y-axis.

The third surface S13 functions as a total reflection surface that totally reflects the picture lights GL on the inner surface side. The third surface S13 is placed nearly in front of the eye EY and has a planar shape like the first surface S11 and the first surface S11 and the third surface S13 are in parallel to each other. Thereby, when the outside world light HL is seen through the first surface S11 and the third surface S13, visibility is zero and particularly not variably powered. Note that the third surface S13 is the surface formed by the hard coat layer 27 provided on the surface of the main body 10s.

In the second light guide part 12, the fourth surface S14 functions as a total reflection surface that totally reflects the picture lights GL on the inner surface side. The fourth surface S14 also functions as a refracting surface that allows the picture lights GL to enter the second light guide part 12. That is, the fourth surface S14 has both functions as a light-incident surface that allows the picture lights GL to enter the light guide member 10 from outside and a reflection surface that propagates the picture lights GL inside of the light guide member 10. Note that the fourth surface S14 is the surface formed by the hard coat layer 27 provided on the surface of the main body 10s.

In the second light guide part 12, the fifth surface S15 is formed by deposition of a light reflection film RM formed using an inorganic material on the surface of the main body 10s, and functions as a reflection surface.

The light transmissive member 50 exhibits higher light transmissivity in the visible range, and the main body part of the light transmissive member 50 is formed using a thermoplastic resin material having nearly the same refractive index as that of the main body 10s of the light guide member 10. Note that the light transmissive member 50 is formed by joining of the main body part to the main body 10s of the light guide member 10 and deposition by hard coat with the main body 10s in the joined state. In short, the light transmissive member 50 is provided with the hard coat layer 27 on the surface of the main body part like the light guide member 10. The first transmissive surface S51 and the third transmissive surface S53 are the surfaces formed by the hard coat layer 27 provided on the surface of the main part.

Note that the light guide device 20 is formed by joining of base materials to be light guide member 10 and the light transmissive member 50 and coating of the joined base materials by dip treatment. That is, the hard coat layer 27 of the light guide member 10 is provided on the entire light guide device 20 with the light transmissive member 50.

As described above, within the light guide member 10, the picture lights from the image generation unit 81 are guided by five reflections from the first surface S11 to the fifth surface S15 including at least two total reflections. Thereby, both display of the picture lights GL and see-through vision of visual recognition of outside world light HL can be achieved and aberration of the picture lights GL can be corrected.

As below, the optical paths of the picture lights GL etc. in the virtual image display apparatus 100 will be explained. The picture lights GL output from the image display device 80 pass through the respective lenses 31, 32 forming the projection lens 30, and thereby, enter the fourth surface S14 having given astigmatism and positive refractive power provided to the light guide member 10 while being converged. Note that the astigmatism is cancelled through the respective surfaces of the light guide member 10, and finally, the picture lights are output toward the eye of the observer in the initial state.

The picture lights GL that have entered and passed through the fourth surface S14 of the light guide member 10 are converged and travel, when passing through the second light guide part 12, are reflected by the fifth surface S15 having relatively weak positive refractive power, and enter the fourth surface S14 from inside again and are reflected.

The picture lights GL reflected by the fourth surface S14 of the second light guide part 12 enter the third surface S13 substantially having no refractive power and are totally reflected and enter the first surface S11 substantially having no refractive power and are totally reflected in the first light guide part 11.

Here, the picture lights GL form an intermediate image in the light guide member 10 before or after passing through the third surface S13. The image plane of the intermediate image corresponds to the image surface OI of the image generation unit 81.

The picture lights GL totally reflected by the first surface S11 enter the second surface S12, and particularly, the picture lights GL entering the half-mirror layer 15 are partially reflected by the half-mirror layer 15 while partially being transmitted through the mirror, and enter and pass through the first surface S11 again. Note that the half-mirror layer 15 acts as one having relatively strong positive refractive power on the picture lights GL reflected here. Further, the first surface S11 acts as one having no refractive power on the picture lights GL passing through the surface.

The picture lights GL that have passed through the first surface S11 enter the pupil of the eye EY of the observer or an equal position thereof as nearly parallel pencils of rays. That is, the observer observes the image as a virtual image formed on the image generation unit (picture device) 81 by the picture lights GL.

On the other hand, of the outside world lights HL, the light entering closer to the +X side than the second surface S12 of the light guide member 10 passes through the third surface S13 and the first surface S11 of the first light guide part 11 and, in this regard, almost no aberration or the like is generated because the third surface S13 and the first surface S11 are nearly in parallel to each other. That is, the observer observes an outside world image without distortion through the light guide member 10. Similarly, of the outside world lights HL, when the light entering closer to the −X side than the second surface S12 of the light guide member 10, i.e., the light transmissive member 50 passes through the third transmissive surface S53 and the first transmissive surface S51 provided therein, no aberration or the like is generated because the third transmissive surface S53 and the first transmissive surface S51 are nearly in parallel to each other. That is, the observer observes the outside world image without distortion through the light transmissive member 50. Further, of the outside world lights HL, when the light entering the light transmissive member 50 corresponding to the second surface S12 of the light guide member 10 passes through the third transmissive surface S53 and the first surface S11, almost no aberration or the like is generated because the third transmissive surface S53 and the first surface S11 are nearly in parallel to each other. That is, the observer observes an outside world image without distortion through the light transmissive member 50. Note that both the second surface S12 of the light guide member 10 and the second transmissive surface S52 of the light transmissive member 50 have nearly the same curved shapes and nearly the same refractive indices, and gaps between the surfaces are filled with bonding layers CC having nearly the same refractive indices. That is, the second surface S12 of the light guide member 10 and the second transmissive surface S52 of the light transmissive member 50 do not act as refracting surfaces on the outside world lights HL.

In the above described configuration, in the virtual image display apparatus 100 of the embodiment, as described above, the projection lens 30 forming the projection see-through device 70 as the virtual image optical system is downsized by intensity distribution control in the image display device 80, and thereby, the whole apparatus is downsized and brightness irregularities and color irregularities are suppressed. Note that, by the downsizing of the projection lens 30, e.g. a slimmed-down compact configuration without protrusion in the lateral direction in the appearance in FIG. 1 may be realized.

As below, referring to FIG. 5, one specific example of degrees of adjustment of output angles with respect to the respective components of the picture lights GL in the image display device 80 will be explained.

FIG. 5 is a conceptual diagram for explanation of an example with respect to output angles of principal rays PR of adjusted picture lights GL. FIG. 5 conceptually shows inclinations (deviation) of the picture lights GL as seen from the image surface OI of the image generation unit 81 as the panel from the light source side. Note that, in the drawing, the output angles of the principal rays PR of the respective component lights of the picture lights GL are shown by arrows D1 to D9. In the case of the example, as illustrated, regarding the in-plane directions in parallel to the image surface OI, it is known that the output angles of the respective component lights of the picture lights GL as output lights are adjusted to be gradually inclined with respect to both the horizontal direction (x-direction) and the vertical direction (y-direction). That is, as illustrated, the output angles are adjusted so that the principal ray PRc of the component output from the position of the intersection with the center optical axis AX on the image surface OI may be output perpendicularly to the image surface OI and the output angles of the principal rays with respect to the center optical axis maybe made larger according to the distances from the center optical axis AX. Particularly, here, the output angles are adjusted so that the aspect ratio of the virtual image to be visually recognized and the aspect ratio of the image surface OI may be kept constant.

Generally, in the case where the virtual image optical system is formed by the non-telecentric optical system in which the output angles of the principal rays are partially different as described above, if the position of the image surface OI, i.e., the position of the image display device 80 containing the image generation unit 81 is moved in the direction of the center optical axis AX for adjustment, the scaling factors of changes with respect to the projection distances are different between the horizontal direction and the vertical direction, and thereby, the aspect ratio in the image surface OI and the aspect ratio of the virtual image to be finally visually recognized by the observer are different.

In contrast, in the embodiment, the adjustment of the output angles in the horizontal direction and the adjustment of the output angles in the vertical direction are correlated with the aspect ratio of the virtual image to be visually recognized and the aspect ratio of the image surface OI, and thereby, the aspect ratios are kept without change in the above described non-telecentric optical system.

Note that the above described example is just an example and various inclinations can be made according to the set aspect ratio, i.e., the shape of the image surface or the like, and the output angles of the principal rays of the output lights at the periphery side may be inclined and output with respect to one direction of the horizontal direction and the vertical direction. Further, in this regard, the output angles of the principal rays may be inclined at different angles between the horizontal direction and the vertical direction.

As a more specific example with respect to the angle settings, an example in which the tangents (tanθ) of the output angles of the respective principal rays PR with respect to the center optical axis AX are proportional to the distances from the center of the image surface OI to the output positions of the respective principal rays PR is considered. That is, the value of tanθ is zero for the principal ray corresponding to the arrow D5, larger as farther from the center optical axis AX, and the maximum for the farthest principal rays from the center optical axis AX corresponding to the arrows D1, D3, D7, D9. Note that, as illustrated, the angles of the respective principal rays PR indicating the output angles of the output lights are provided (or set) symmetrically with respect to the horizontal direction and the vertical direction with reference to the center optical axis AX, and the principal rays PR output from the respective positions on the image surface OI intersect on the center optical axis AX. As described above, the symmetry is provided and, particularly, regular inclination angles are provided with respect to the tangents, and thereby, pencils of rays at the balanced degree of focus may be formed.

As described above, in the virtual image display apparatus 100 according to the embodiment, the principal rays PRp of the component lights output from the periphery side of the respective positions on the image surface OI generated in the image generation unit 81 forming the image display device 80 are controlled by the intensity distribution control unit 82 and output to be inclined more largely toward the center optical axis side than the principal ray PRc of the component light output from the center side. Thereby, the projection lens 30 forming the virtual image optical system provided at the downstream of the optical path of the image display device 80 may be downsized, and further, the whole apparatus may be downsized. Furthermore, in the image display device 80, for example, the output states of the output lights are controlled by the intensity distribution control unit 82, for example, control is performed to output the lights in the strongest intensity distributions with respect to the axial directions of the principal rays PR of the respective component lights of the picture lights GL output in the respective positions, and thereby, brightness irregularities and color irregularities may be suppressed. In addition, the output angles of the respective component lights are adjusted according to the aspect ratio of the image surface OI, and thereby, a configuration that can make the relative position adjustment between the image display device 80 and the vertical image optical system may be obtained.

Figure 4A:
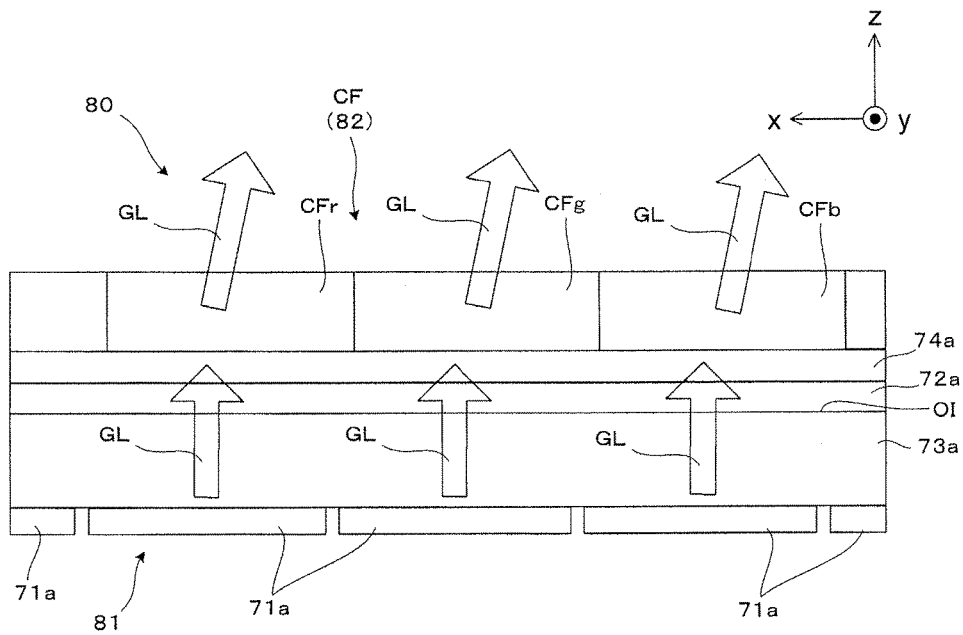
FIG. 4A is a conceptual diagram regarding one configuration example of an image display device showing a state at the periphery side of the device.
Figure 4B:
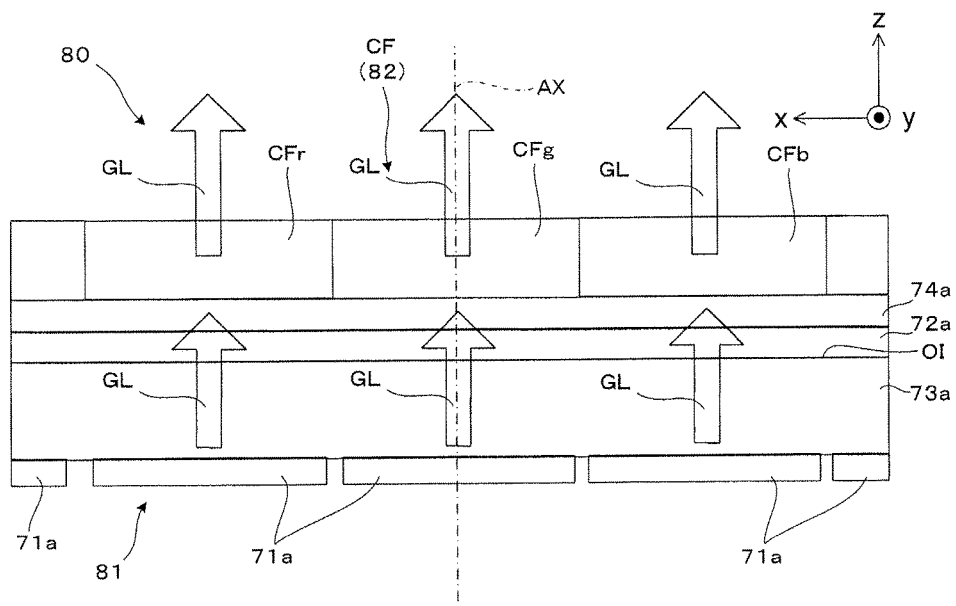
FIG. 4B is a conceptual diagram showing a state at the center side of the device.
Figure 6:
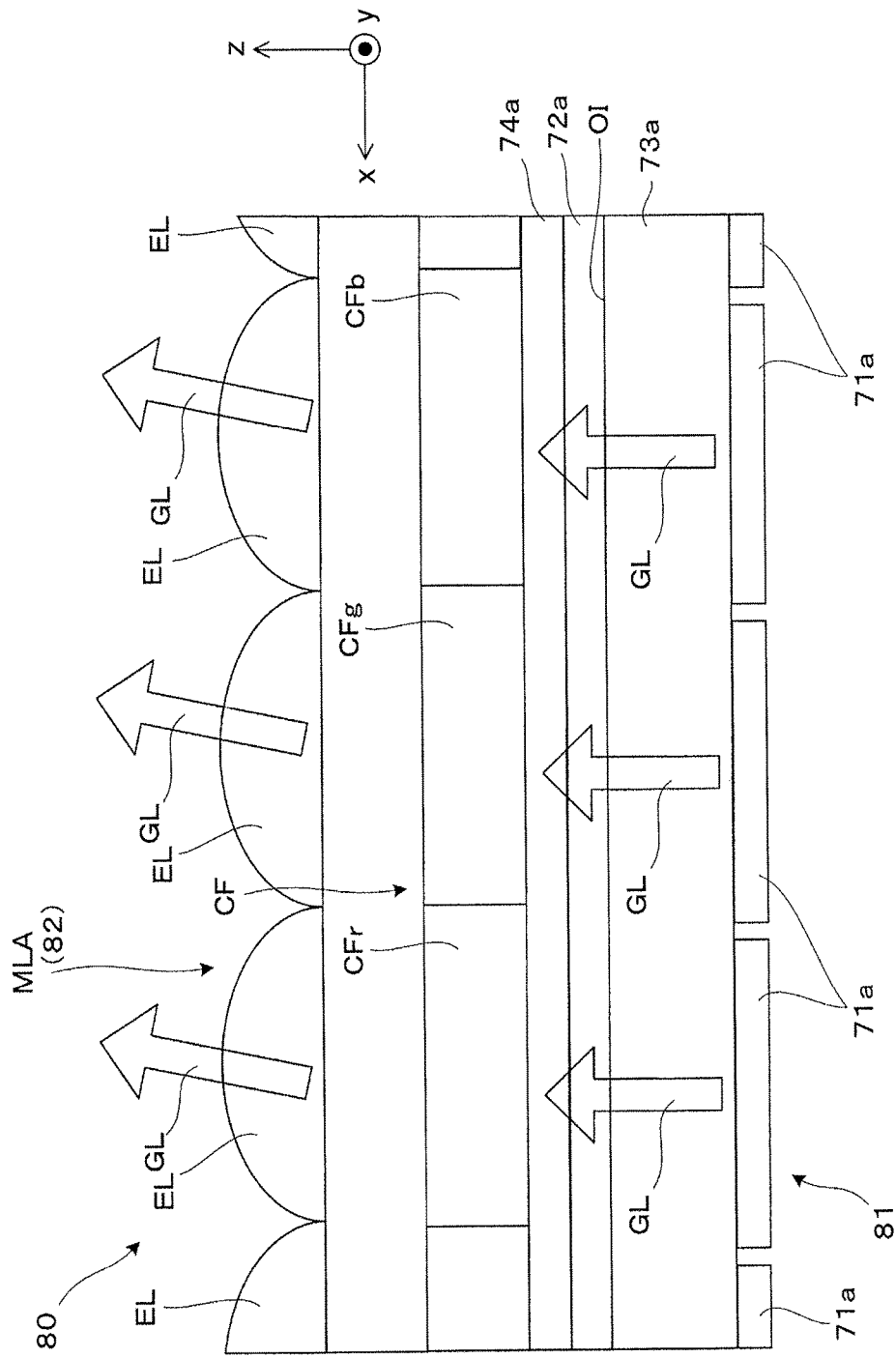
FIG. 6 is a conceptual diagram for explanation of one modified example of the image display device.

FIG. 6 is a conceptual diagram for explanation of one modified example of the image display apparatus 80, and corresponds to FIG. 4A. In the one modified example shown in FIG. 6, a microlens array MLA is provided on the color filter CF. In the modified example, the microlens array MLA functions or the microlens array MLA and the color filter CF cooperatively function as the intensity distribution control unit 82. Specifically, a plurality of element lens EL forming the microlens array MLA are arranged in a matrix form in correspondence with the color filter parts CFr, CFg, CFb for the respective colors forming the color filter CF, and the shapes of the respective element lenses EL are non-uniformly arranged with respect to the arrangement of the pixels in response to the positions in which the color filter parts CFr, CFg, CFb for the respective colors are provided, i.e., the positions of the pixels in the matrix form forming the image surface OI (the positions of the electrodes 71a).

Specifically, for example, the outer shapes vary, the positions of the respective element lenses EL corresponding to the respective pixels are shifted, or the microlens array MLA is provided with a smaller pitch than the pixel pitch. Thereby, the microlens array MLA singly or cooperatively with the color filter CF functions as the intensity distribution control unit 82 that performs adjustment of the respective component lights forming the picture lights GL.

Figure 7:
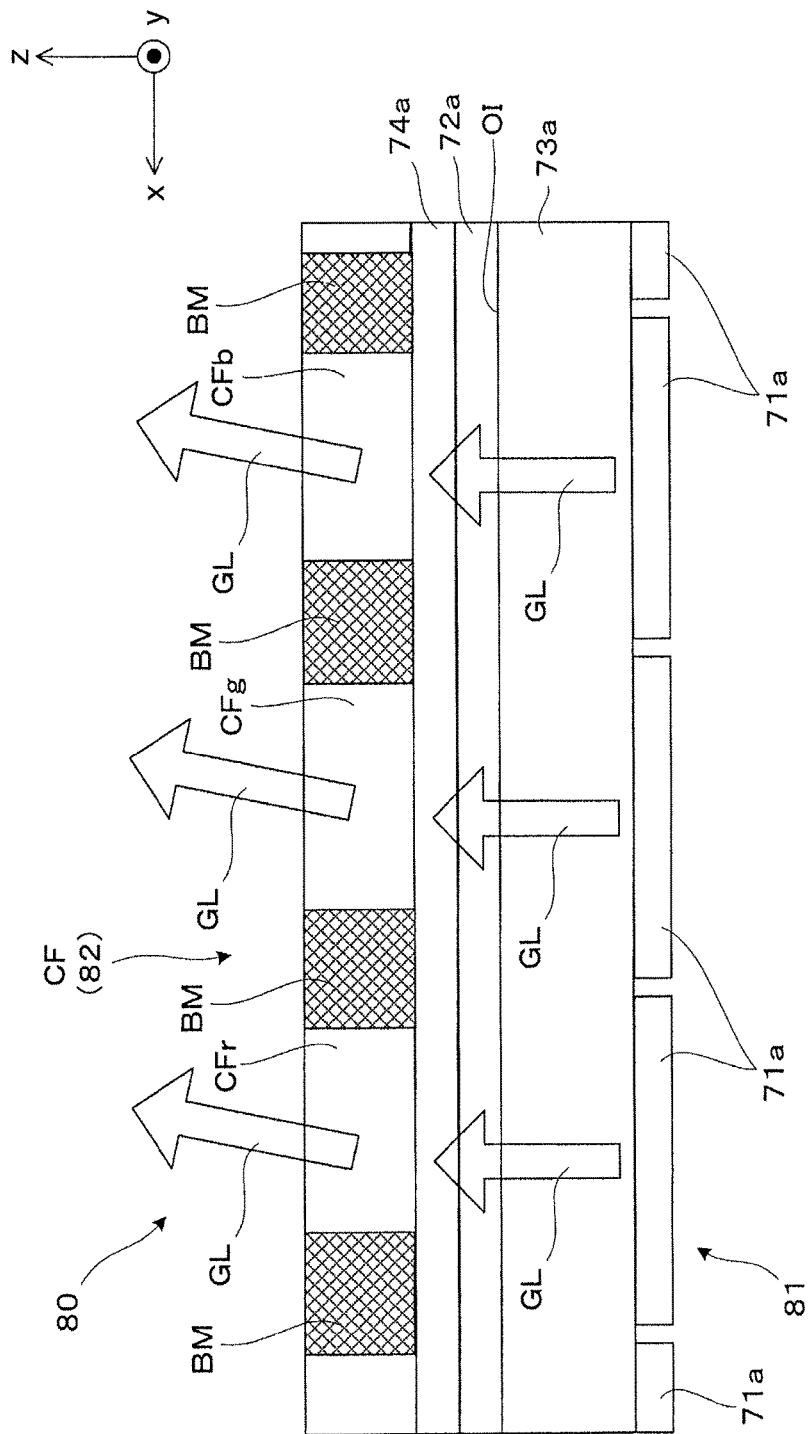
FIG. 7 is a conceptual diagram for explanation of another modified example of the image display device.

FIG. 7 is a conceptual diagram for explanation of another modified example of the image display apparatus 80, and corresponds to FIG. 4A. In the one modified example shown in FIG. 7, black matrices BM are provided between the color filter parts CFr, CFg, CFb for the respective colors forming the color filter CF. In the modified example, the shapes of the black matrices BM are changed in response to the positions in which the color filter parts CFr, CFg, CFb for the respective colors are provided, i.e., the positions of the pixels in the matrix form forming the image surface OI (the positions of the electrodes 71a), and thereby, they are allowed to function as the intensity distribution control unit 82 that performs adjustment of the respective component lights forming the picture lights GL.

Figure 3:
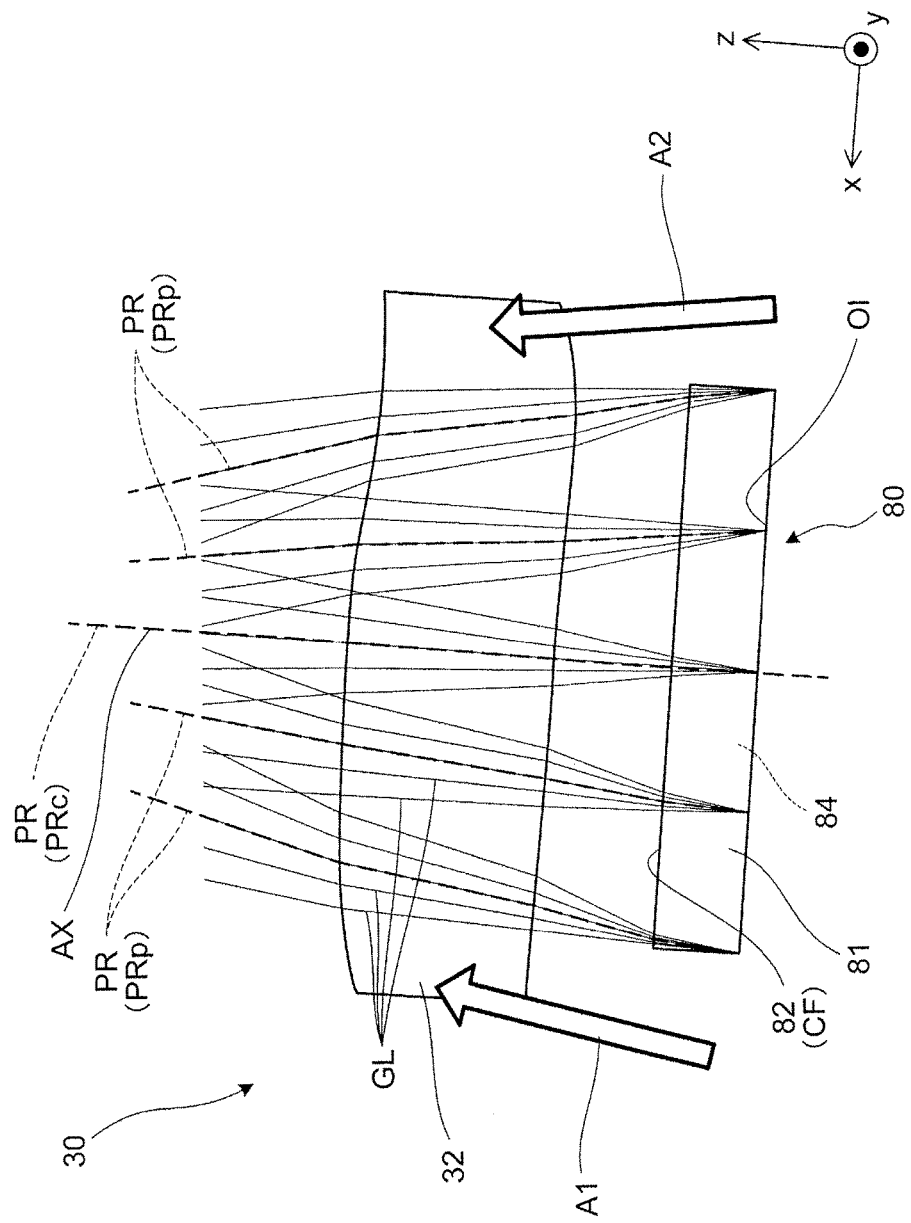
FIG. 3 is a partially enlarged view of FIG. 2.
Figure 8:
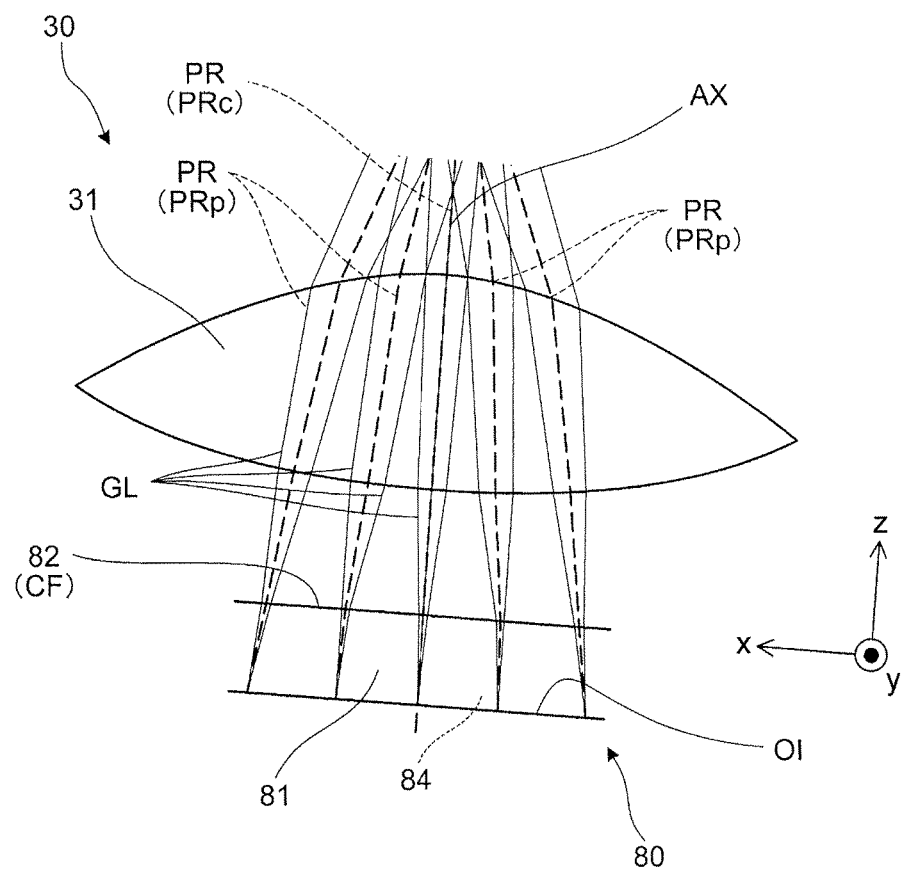
FIG. 8 is a partially enlarged view for explanation of another modified example of the virtual image display apparatus.

FIG. 8 is a conceptual diagram for explanation of another example of the virtual image display apparatus 100, and corresponds to the partially enlarged view of FIG. 3. In this example, the first lens 31 provided at the immediate downstream of the image display device 80 of the lenses forming the projection lens 30 is formed by a convex lens having positive power. In this case, the respective partial pencils of rays forming the picture lights GL may be further focused, and thereby, the projection lens 30 forming the vertical image optical system may be further downsized.

Others

As above, the invention is explained according to the respective embodiments. However, the invention is not limited to the above described embodiments, but may be implemented in various forms without departing from the scope thereof. For example, the see-through vertical image display apparatus is explained as above, however, the structure shown in the embodiment may be applied to vertical image display apparatuses not providing see-through vision.

Figure 9:
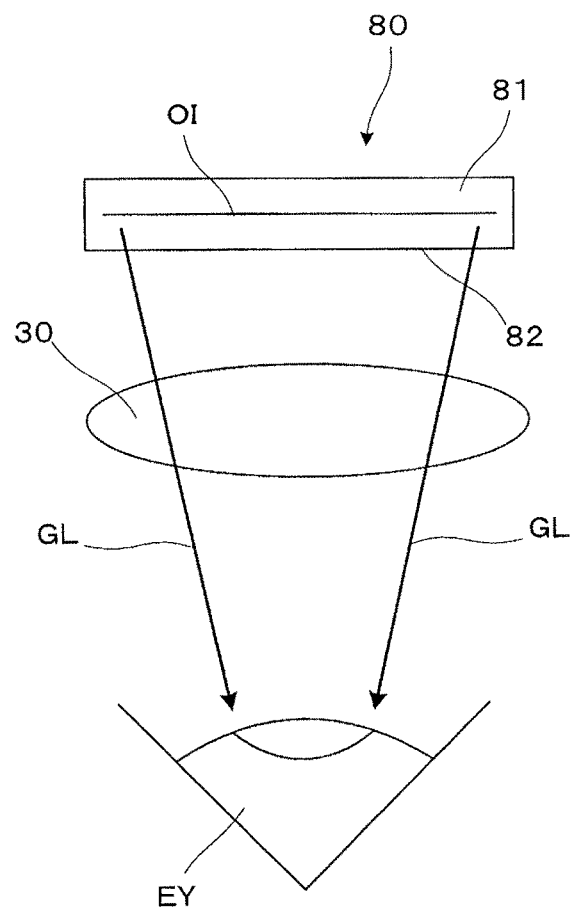
FIG. 9 is a conceptual diagram for explanation of another modified example of the virtual image display apparatus.

FIG. 9 is a conceptual diagram for explanation of another example of the virtual image display apparatus 100, and shows one that can be applied to an HMD not providing see-through vision with a blocked field of view. In this example, the image display device 80 is provided ahead of the line of sight of the eye EY of the observer, and the projection lens 30 as the virtual image optical system or eyepiece optical system is provided between the image display device 80 and the eye EY of the observer. Also, in this case, the image display device 80 having the image generation unit 81 that generates the above described image surface OI and the intensity distribution control unit 82 that performs intensity distribution control is applied, and thereby, the projection lens 30 forming the virtual image optical system may be downsized.

Figure 10B:
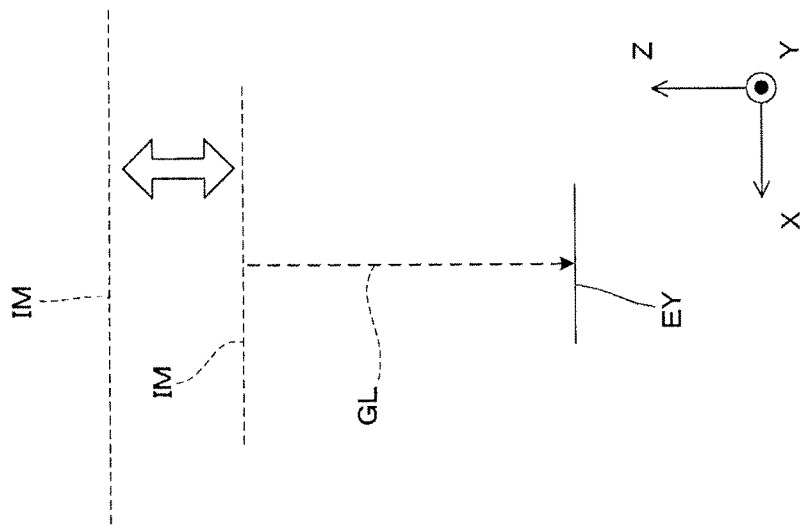
FIG. 10A is a diagram for explanation of one example of a virtual image display position adjustment part, and FIG. 10B conceptually shows a state of change in view of the virtual image.
Figure 10A:
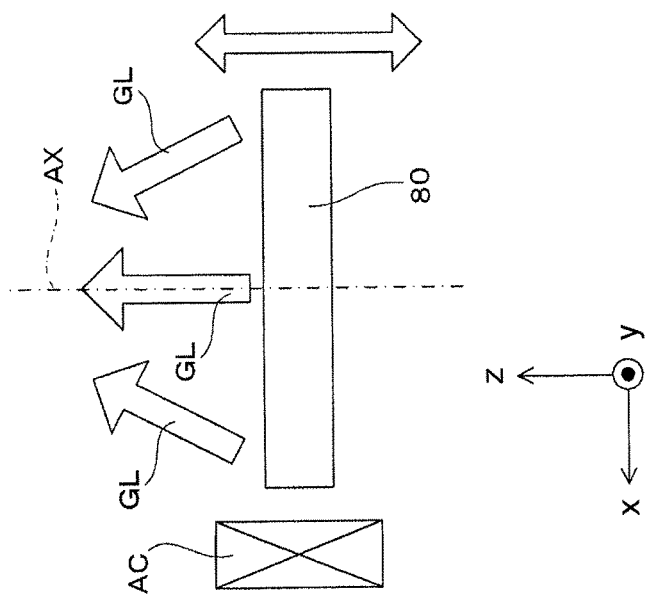

Further, in the virtual image display apparatus 100, a virtual image display position adjustment part that adjusts the display position of the virtual image by moving the image display device 80 may be provided. FIGS. 10A and 10B are diagrams for explanation of one example of the virtual image display apparatus having the virtual image display position adjustment part, and FIG. 10A conceptually shows an example of the virtual image display position adjustment part having an actuator AC for moving the image display device 80 with respect to the optical axis AX, i.e., the z-direction shown in the drawing. Further, FIG. 10B conceptually shows a state of change in view of a virtual image IM by adjustment in the virtual image display position adjustment part including the actuator AC or the like. Here, for example, in the configuration shown in FIG. 10A, convex portions are provided on the upper and lower surfaces of the image display device 80, on the other hand, a guide groove having a concave portion corresponding to the convex portion is provided to extend along the optical axis AX within the lens tube housing the image display device 80 and the projection lens 30 (see FIG. 2), and the convex portion and the concave portion are engaged and so that the device may be movable by the actuator AC. In the above described case, as shown in FIG. 10B, when the object position, i.e., the position of the panel surface of the image display device 80 is moved closer to the lens surface of the projection lens 30 (see FIG. 2), the virtual image IM is seen in the closer position from the observer side (eye EY), and when the image display device 80 is moved farther, the virtual image IM is seen in the farther position.

Here, in the case of a general non-telecentric optical system, when the position of the image display position, i.e., the panel surface is moved from the designed position, the shape of the virtual image to be virtually recognized changes because the rate of change of the rays in the longitudinal direction and the rate of change in the lateral direction are different. For example, if the picture lights from the image display device are output at angles different between left and right, the shape of the virtual image is different between left and right with the movement of the panel surface.

On the other hand, in the embodiment, as explained with reference to FIG. 5, in the case where the picture lights GL are formed by the non-telecentric optical system centrally symmetric and directed inward, the aspect ratio is kept without change. Thereby, the virtual image position can be freely set while image distortion in the adjustment by the virtual image display position adjustment part is suppressed. For example, the image display device 80 is moved with respect to the z-direction, the position of the virtual image IM may be adjusted from infinity to about several tens of centimeters.

Note that the above described virtual image display position adjustment part is just an example, and may have another configuration as long as it can adjust the position of the image display device with respect to the z-direction (the direction along the optical axis AX). In the above description, the device may be made automatically movable by the actuator AC, however, for example, a grasping part may be provided on the device side surface for moving the image display device 80 by the observer and manually adjusted. Or, adjustment by the virtual image display position adjustment part may be performed in the manufacturing stage. That is, the virtual image position may be changed according to the use application of the virtual image display apparatus.

Further, in the above description, the intermediate image corresponding to the display image of the image generation unit 81 is formed within the light guide member 10, however, the configuration may be applied to a virtual image display apparatus that guides light without forming any intermediate image.

Furthermore, in the above description, the optical systems including the projection lens and the like may not have any non-axisymmetric aspheric surface.

In the above description, the half-mirror layer (semi-transmissive reflection film) 15 is formed in the lateral rectangular region, however, the contour of the half-mirror layer 15 may be appropriately changed according to the application or other specifications. Further, the transmittance and reflectance of the half-mirror layer 15 may be changed according to the application or other specifications.

In the above description, as the image display device 80, the image generation unit 81 containing the OLED (organic EL) is used, however, as the image display device 80, various devices including the image generation unit 81 of a transmissive liquid crystal display device or the like may be used. For example, a configuration using a reflective liquid crystal display device can be employed, and a digital micromirror device or the like may be used in place of the image generation unit 81 including the liquid crystal display device. Further, as the self-emitting device, an LED array or the like may be used.

In the above described embodiments, the panel-type image display device 80 containing the OLED (organic EL) is used, however, not limited to that. A scan-type image display device may be used instead. Specifically, for example, light diffusion elements are provided on the image surface OI and an image is formed by scanning the positions on the image surface OI with light by the scan-type illumination system, the picture lights are output by the diffusion action of the light diffusion elements, and thereby, the same configuration as above may be applied.

In the above description, the virtual image display apparatus 100 having the pair of display apparatuses 100A, 100B are explained, however, only a single display apparatus may be employed. That is, one pair of the projection see-through device 70 and the image display device 80 are not provided for each of the right eye and the left eye, but the projection see-through device 70 and the image display device 80 may be provided only for one of the right eye and the left eye and the image may be seen with one eye.

In the above description, the half-mirror layer 15 is the simply the semi-transmissive film (dielectric multilayer film), however, the half-mirror layer 15 may be replaced by a planar or curved hologram element.

In the above description, the light guide member 10 etc. extend in the lateral direction in which the eyes EY are aligned, however, the light guide member 10 may be provided to extend in the longitudinal direction. In this case, the light guide member 10 has a parallel-arrangement structure, not the series-arrangement structure.

Further, a light shielding structure may be provided in the light guide path to suppress generation of ghost light due to the components of the picture lights. When the picture lights GL output from the image display device 80 are inclined as in the embodiment, the component of the picture lights GL entering from outside of a predetermined range can generate ghost light. For this, the light shielding structure may be provided to suppress generation of ghost light. For example, it is conceivable that the light shielding structure is formed by a diaphragm or the like in a part in which the sections of pencils of rays the picture lights GL are smaller like the surface at the image display device 80 side (light-incident surface) of the optical surfaces of the lens 31 forming the projection lens 30 in FIG. 2. The lights are shielded in the part in which the sections of pencils of rays of the picture lights GL are smaller, in other words, in a part in which many components are superimposed and pass, and thereby, a phenomenon that only a part of the virtual image is extremely dark may be avoided while suppressing the generation of ghost light. Or, in the case where the position of the image display device 80 in the z-direction is changed by the virtual image display position adjustment part exemplified in FIGS. 10A and 10B, the position of shielding lights may be changed in response thereto.

Or, in the case where locations in which the principal rays PR of the respective component lights (partial pencil of rays) of the picture lights GL intersect with the optical axis AX (or intersection points) are set, for example, the intersection locations may be provided nearly in the center position of the light-incident part of the projection lens 30 or the light guide member 10. In this case, the size about the optical axis of the light-incident part of the projection lens 30 or the light guide member 10, i.e., the size with respect to the in-plane direction in parallel to the xy-plane may be minimized. That is, the size of the whole apparatus may be made smaller by suppressing the width and the height of the projection lens 30 or the light guide member 10. Or, in the case where the intersection locations (or intersection points) are provided in one lens of the plurality of lenses forming the projection lens 30, the locations are provided in the thickest one of the lenses forming the projection lens 30 in the direction of the optical axis AX, and thereby, the projection lens 30 may be downsized.

The entire disclosure of Japanese Patent Application No.2015-062187, filed Mar. 25, 2015 is expressly incorporated by reference herein.

What is claimed is:

1. A virtual image display apparatus comprising:
   an image display device having
      an image generation unit that generates image light from one side of the image generation unit, the image light having a first principal ray which is emitted from a first position of the one side and a second principal ray which is emitted from a second position of the one side, and
      a color filter that is provided over the one side of the image generation unit such that the first principal ray and the second principal ray pass through; and
   a virtual image optical system that allows visual recognition of the image light which passed through the color filter, wherein
      a first strongest intensity direction of the first principal ray which passed through the color filter is inclined toward a center optical axis of the image generation unit with a first angle, the first angle being an angle between the first strongest intensity direction and the center optical axis,
      a second strongest intensity direction of the second principal ray which passed through the color filter is inclined toward the center optical axis of the image generation unit with a second angle, the second angle being an angle between the second strongest intensity direction and the center optical axis,
      the first angle is larger than the second angle, and
      the second position is positioned between the center optical axis and the first position, wherein the first and second angles of the first and second strongest intensity directions of the first and second principal rays are adjusted with respect to at least one of the horizontal direction and the vertical direction, in response to an aspect ratio of a virtual image to be virtually recognized.

2. The virtual image display apparatus according to claim 1, wherein the color filter outputs the principal rays toward the virtual image optical system with inclinations of output angles of the principal rays of output lights at the periphery side in at least one direction of a horizontal direction and a vertical direction with respect to in-plane directions in parallel to an image surface.

3. The virtual image display apparatus according to claim 2, wherein the color filter outputs the principal rays toward the virtual image optical system with inclinations of the output angles of the principal rays in the horizontal direction at different angles from the output angles of the principal rays in the vertical direction.

4. The virtual image display apparatus according to claim 2, wherein the color filter adjusts the output angles of the principal rays in the vertical direction relative to the output angles of the principal rays in the horizontal direction according to a shape of the image surface.

5. The virtual image display apparatus according to claim 4, wherein, when the image display device is moved along the center optical axis, the color filter adjusts the output angles according to a relationship between an aspect ratio of the virtual image to be visually recognized and an aspect ratio of the image surface.

6. The virtual image display apparatus according to claim 1, wherein the image generation unit outputs lights in the strongest intensity distributions with respect to axial directions of the principal rays of components output from the respective positions on an image surface.

7. The virtual image display apparatus according to claim 1, wherein, in the image display device, the output angles of the lights output from the respective positions on an image surface are set symmetrically with reference to the center optical axis, and the principal rays of the lights output from the respective positions on the image surface intersect on the center optical axis.

8. The virtual image display apparatus according to claim 1, wherein the color filter outputs the principal ray of a component output from a position of an intersection point with the center optical axis in an image surface perpendicularly to the image surface, and gradually increases the output angles of the principal rays with respect to the center optical axis in response to distances from the center optical axis.

9. The virtual image display apparatus according to claim 1, wherein, in the image display device, tangents of the output angles of the principal rays output from the respective positions on an image surface with respect to the center optical axis are proportional to distances from a center of the image surface to the output positions of the respective principal rays.

10. The virtual image display apparatus according to claim 1, wherein the image device contains organic EL that emits light with respect to each pixel forming an image surface as the light source.

11. The virtual image display apparatus according to claim 1, wherein the image generation unit is a pixel matrix that forms an image surface by arrangement of pixels in a matrix form, and the color filter has different shapes with respect to each position on the image surface with respect to a pitch of the pixels in the matrix form forming the image surface.

12. The virtual image display apparatus according to claim 11, wherein the color filter is color filter layers arranged with a smaller pitch than the pitch of the pixels in the matrix form forming the image surface.

13. The virtual image display apparatus according to claim 1, further comprising a virtual image display position adjustment part that adjusts a display position of the virtual image by moving the image display device.

* * * * *